US00RE39728E

(19) United States
(12) Reissued Patent
Dumplet

(10) Patent Number: US RE39,728 E
(45) Date of Reissued Patent: Jul. 17, 2007

(54) MULTIPOSITIONAL APPARATUS FOR HANGING THINGS

(76) Inventor: Elsa Dumplet, 710 West End Ave., Apt. 6C, New York, NY (US) 10025

(21) Appl. No.: 10/259,104

(22) Filed: Sep. 26, 2002

Related U.S. Patent Documents

Reissue of:
(64) Patent No.: 6,123,238
Issued: Sep. 26, 2000
Appl. No.: 09/459,735
Filed: Dec. 13, 1999

(51) Int. Cl.
*A41H 43/00* (2006.01)

(52) U.S. Cl. ..... 223/1; 223/DIG. 1; 223/DIG. 2; 223/DIG. 4; 211/113

(58) Field of Classification Search ..... 223/1, 223/85, DIG. 1, DIG. 2, DIG. 4; 211/113, 211/117, 118, 89; 452/117, 128; D6/315
See application file for complete search history.

(56) References Cited

U.S. PATENT DOCUMENTS 365,389 A * 6/1887 Koegel ..... 211/30
2,945,471 A * 7/1960 Harrold ..... 118/58
4,034,865 A * 7/1977 Batts et al. ..... 211/118
4,121,720 A * 10/1978 Hayes ..... 211/113
4,592,472 A * 6/1986 Carnera ..... 211/119.01
4,690,288 A * 9/1987 Mitchell ..... 211/113
4,709,838 A * 12/1987 Campbell ..... 223/85
4,863,043 A * 9/1989 Bowen ..... 211/113
5,282,553 A * 2/1994 Ibled ..... 223/85
5,642,841 A * 7/1997 Beaty ..... 223/85

* cited by examiner

*Primary Examiner*—Gary L. Welch
(74) *Attorney, Agent, or Firm*—Steven Horowitz

(57) ABSTRACT

Multipositional apparatus for hanging articles such as ties, belts, shoes, bras, hats, etc. includes a flexible main body comprising a series of intertwined rigid links including a first end link, a series of intermediate links and a second end link, as well as a plurality of hooks that project from the links, including at least several intermediate hooks that project perpendicularly from a segment of the series of intermediate links and including an end hook projecting from the first end link. The hooks have a straight portion and a curved portion, the curved portion shaped so as to receive articles or to be hung on a projecting member. The straight portion of the end hook is aligned collinearly with an axis of the nearest segment of the series of intermediate links. The entire apparatus is suitable for being hung by a selected hooks which may be any of several hooks and is adjustable in length and shape by virtue of which hook is the selected hook to hang the apparatus on. If the apparatus is hung by an end hook or by the intermediate nearest the end hook all of the remaining nonselected hooks face upward and can be used to hang articles. If any of several other of the intermediate hooks is the selected hook, then most or all but one of the remaining nonselected hooks face upward and can be used to hang articles. The hooks are common metal hooks used in clothes hangers.

4 Claims, 2 Drawing Sheets

MULTIPOSITIONAL APPARATUS FOR HANGING THINGS

Matter enclosed in heavy brackets [ ] appears in the original patent but forms no part of this reissue specification; matter printed in italics indicates the additions made by reissue.

This invention relates to apparatus for hanging clothing and accessories and the like and more particularly to apparatus that are hung on any projecting member, such as a peg on the door or wall of a clothes closet.

Clothes closets have limited space. Items such as hats, ties, belts, shoes, bras etc. are hard to store. It would be very helpful to have a device for the storage of all of these items.

Sometimes, a hanging device is satisfactory but there is no room for it because it is too long. It would be advantageous to have a device for hanging items such as hats, ties, belts, shoes, bras, etc. that is adjustable in size and shape.

Various devices may be available on which to hang clothing and accessories such as hats, ties, belts, bras etc. but the cost of manufacturing them makes their price less attractive, they are too complex and/or they are not adjustable in size and shape. For example, U.S. Pat. No. 4,034,865 to Batts et al., U.S. Pat. No. 4,709,838 to Campbell, U.S. Pat. No. 4,863,043 to Bowen, U.S. Pat. No. 5,282,553 to Ibled and U.S. Pat. No. 5,642,841 to Beaty disclose various apparatus for hanging accessories.

The present invention can be made out of standard metal clothes hangers and a chain and is adjustable. It consists of a main body made of a chain and has hooks protruding from various links in the chain. The apparatus of the present invention can be held up and hung from its end hook or from various intermediate hooks. The selection of the hook will determine the size and shape of the apparatus while it is in operation.

OBJECTS AND ADVANTAGES

The following important objects and advantages of the present invention are:

(1) to provide a device for conveniently hanging clothing and accessories such as ties, belts, hats, bras, shoes, (2) to provide a device that allows hanging clothing and accessories such as listed above that can be adjusted in length and shape, and (3) to provide a device for hanging hats, ties, belts, shoes, bras, etc. that is so simple to construct that it can be made by anyone out of simple metal clothes hangers and simple chains.

DETAILED DESCRIPTION OF THE PREFERRED EMBODIMENT

Figure 1:
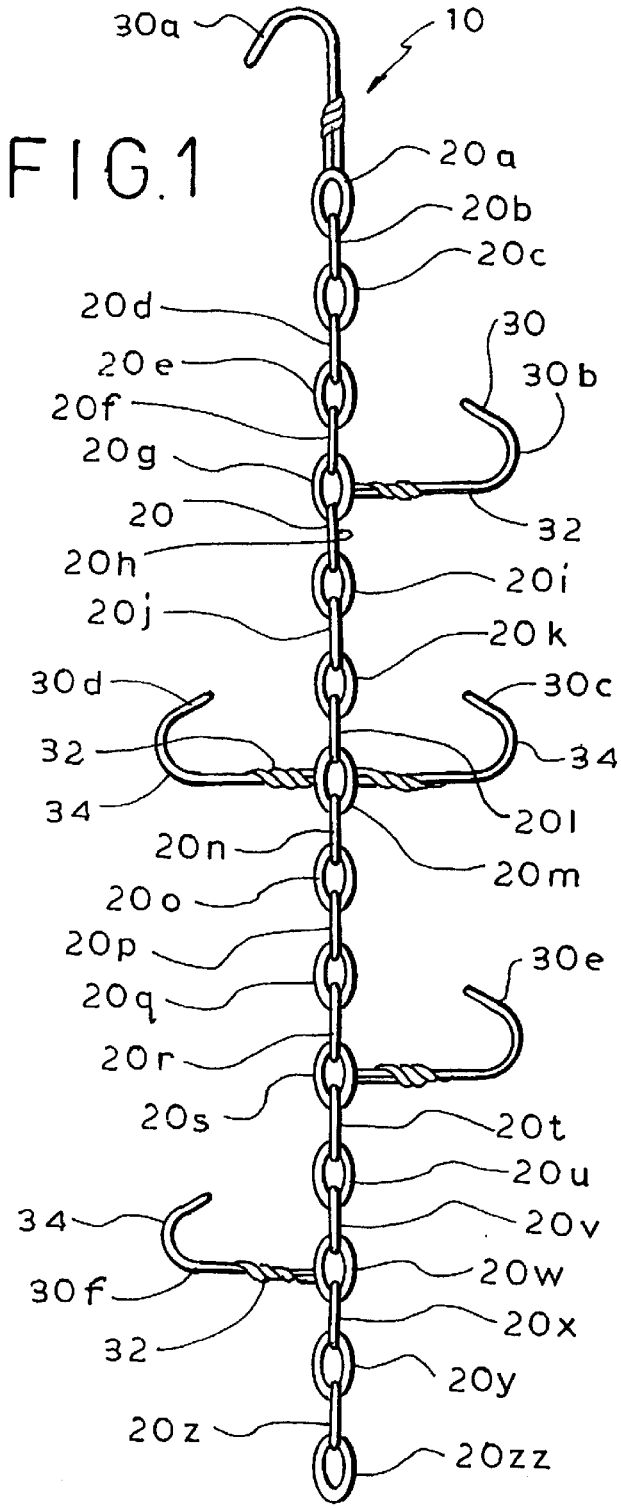
FIG. 1 is a front view of the apparatus of the present invention ready to be hung by the end hook.

In order to better understand the present invention in conjunction with the drawings of FIGS. 1–3, the apparatus of the present invention is assigned reference numeral 10 and its elements are described and assigned the reference numerals identified below. FIG. 1 depicts a front view showing the primary configuration of the multipositional apparatus 10 of the present invention for hanging articles of clothing or the like. In that configuration the apparatus 10 can be hung by what will be described below as its end hook. FIG. 3 is a front view of an alternative configuration of the apparatus 10.

Figure 2:
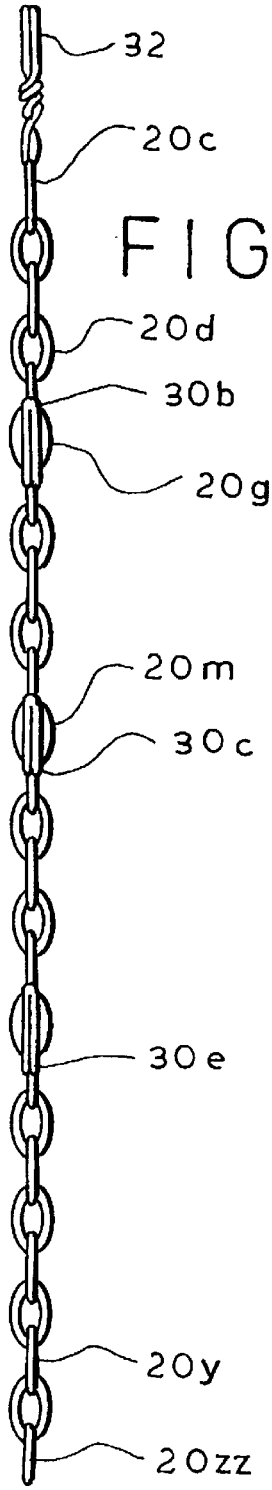
FIG. 2 is a side view of the apparatus of the present invention ready to be hung by the end hook.
Figure 3:
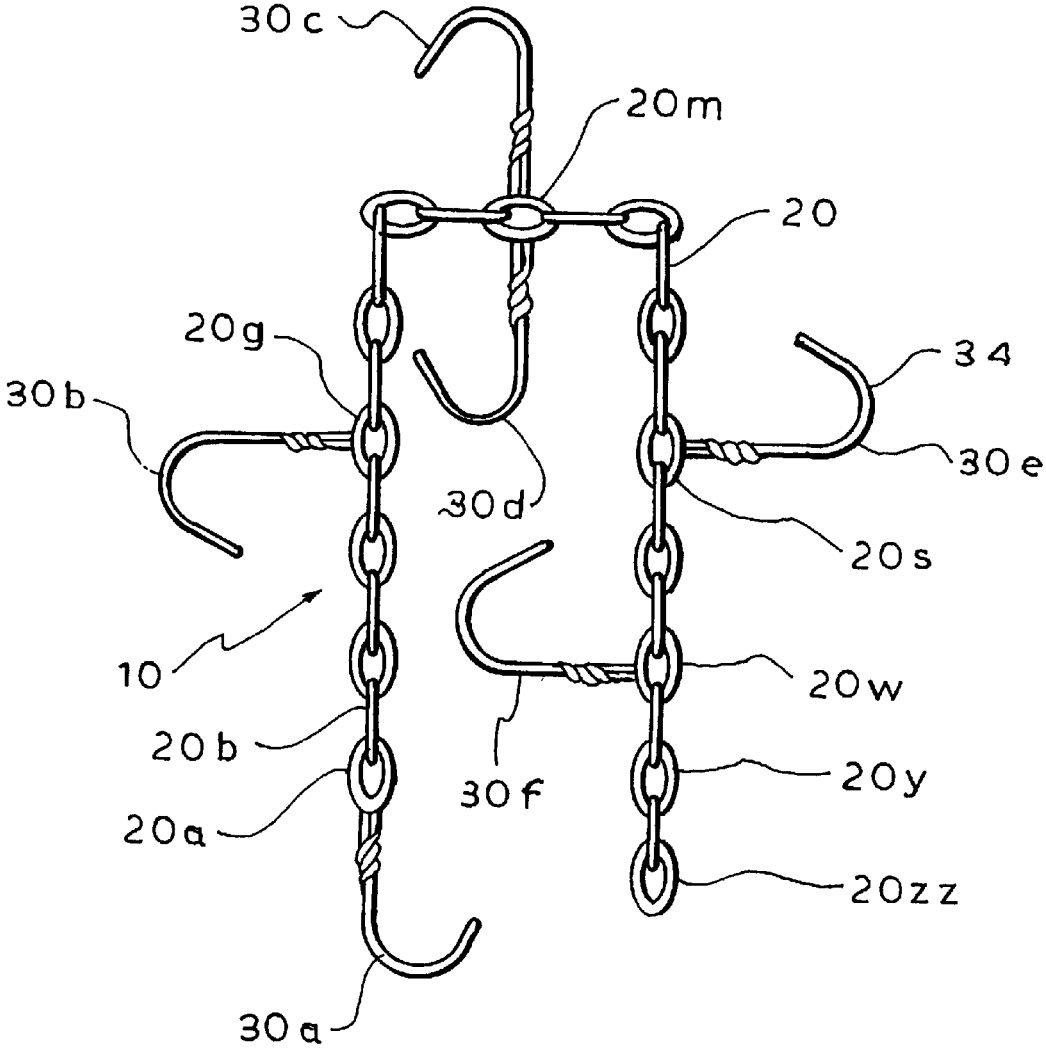
FIG. 3 is a front view of an alternative configuration showing the apparatus of the present ready to be hung by an intermediate hook.

As seen from FIGS. 1–3, the main body 20 of apparatus 10 is flexible and is made of a series of intertwined rigid links 20 including a first end link 20a, a series of intermediate links 20b, 20c, 20d, 20e, 20f, 20g, 20h, 20i, 20j, 20k, 20l, 20m, 20n, 20o, 20p, 20q, 20r, 20s, 20t, 20u, 20v, 20w, 20x, 20y, 20z and a second end link 20zz, a plurality of hooks 30 soldered to and projecting from links 20, including at least several intermediate hooks 30b, 30c, 30d, 30e, 30f that project perpendicularly from a segment 24 of the series of intermediate links 20b, 20c, 20d, 20e etc. Besides soldering, hooks 30 may be connected to rigid links 20 [may] *by* any suitable means.

End hook 30a projects from the first end link 20a. Hooks 30 each contain a straight portion 32 and a curved portion 34. Curved portion 34 is shaped so as to receive articles and to be hung on a projecting member such as a peg or other rodlike projection (not shown). Accordingly, end hook 30a projects from first end link 20a such that the straight portion 32 of end hook 30a is aligned collinearly with an imaginary axis of the segment 24 of the series of intermediate links 20b, 20c, 20d, 20e etc. that is nearest end hook 30a.

Apparatus 10 can be hung up on a wall or door or elsewhere where there is a peg or other projection by placing one of the hooks 30 of apparatus 10. Apparatus 10 is adjustable in length and shape and is configurable so that more than one hook can be selected to hang the apparatus on and still allow either all of the remainder or, in some configurations most of the remainder, of the plurality of hooks 30 to face upward and thereby allow articles to be hung easily on the curved portions thereof. Depending on which hook 30 is used to hang apparatus 10 on, the shape or configuration of apparatus 10 changes. The apparatus 10 of the present invention permits one to select a hook 30 that allows all or most of the remaining hooks 30 to be facing upward and be able to receive articles for hanging. Due to the configuration of the hooks on apparatus 10, most of the hooks 30 of apparatus 10 are suitable for this.

It should be noted that the best position of hooks 30 for hanging accessories or clothing is that with the curved portions 34 of hooks 30 facing upward. When curved portion 34 of a particular hook 30 is facing downward, the item can still be hung but the possibility of slipping off the hook 30 is much greater.

In its primary configuration as seen in FIG. 1, when end hook 30a is selected to be the hook on which apparatus 10 is hung, i.e. is the selected hook, intermediate hooks 30b, 30c, 30d, 30e, 30f (all nonselected hooks) face upward which allows articles such as ties, belts, bras, hats etc. to be hung on the curved portion 34 of intermediate hooks 30b, 30c, 30d, 30e, 30f. When the apparatus 10 is hung by intermediate hook 30b, i.e., when intermediate hook 30b is the selected hook, intermediate hook 30b being the intermediate hook nearest the end hook 30a, then end hook 30a and intermediate hooks 30c, 30d, 30e, 30f face upward and allow articles to be hung on the curved portion 34 of end hook 30a and intermediate hooks 30c, 30d, 30e, 30f When the apparatus is hung by intermediate hook 30c, i.e. intermediate hook 30c is the selected hook, the configuration depicted in FIG. 3, then end hook 30a and intermediate hooks 30d, 30e, 30f face upward thus allowing articles to be hung on the curved portion 34 of end hook 30a and intermediate hooks 30d, 30e, 30f Only intermediate hook 30b faces downward. Finally, when the apparatus is hung by intermediate hook 30d, i.e. intermediate hook 30d is the selected hook, then end hook 30a and intermediate hooks 30c, 30e, 30f face upward thus allowing articles to be hung on the curved portion 34 of end hook 30a and intermediate hooks 30c, 30e, 30f. Only intermediate hook 30b faces downward.

Thus apparatus 10 can be configured in length and shape depending upon how much room exists where the apparatus is being hung. For example, if apparatus 10 is hung near the floor, configuration depicted in FIG. 3, with hook 30c being used to hang apparatus 10, is preferable to the configuration shown in FIG. 1 since the length of apparatus 10 is shortened when configured as seen in FIG. 3.

It is contemplated by the present invention that apparatus 10 of the present invention can be designed with additional or fewer links 20 from those links 20 shown in FIGS. 1–3 so that main body 10 is longer or shorter. Furthermore, apparatus 10 can also be designed with additional hooks beyond 30a, 30b, 30c, 30d, 30e, 30f or with fewer hooks. If additional hooks 30g, 30h, etc. are included in apparatus 10 they may be placed on any suitable link 20. Preferably, additional hooks 30g, 30h should be placed on links 20 so that they face upward and allow articles to be hung thereon when apparatus 10 is configured in as many configurations as possible.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A multipositional apparatus for hanging articles of clothing, accessories and the like, comprising:

a flexible main body comprising a series of intertwined rigid links including a first end link, a series of intermediate links and a second end link, *at least one link in the series of intermediate links having no hook projecting therefrom,* a plurality of hooks [soldered to and] projecting from the links, including at least several intermediate hooks that project perpendicularly from a segment of the series of intermediate links and including an end hook projecting from the first end link, said hooks containing a straight portion and a curved portion, said curved portion shaped so as to receive articles or to be hung on a projecting member, the straight portion of said end hook aligned collinearly with an axis of a segment of the series of intermediate links nearest said end hook, the apparatus being adjustable in length and shape and configurable so that more than one hook can be selected to hang the apparatus and still allow most of a remainder of the plurality of hooks to face upward and thereby allow articles to be hung on the curved portion of said remainder of the plurality of hooks.

2. The apparatus of claim 1, wherein the links and the hooks are made of metal *and wherein the plurality of hooks are soldered to the links.*

[3. A multipositional apparatus for hanging articles of clothing, accessories and the like, comprising:

a flexible main body comprising a series of intertwined rigid links including a first end link, a series of intermediate links and a second end link, a plurality of hooks soldered to and projecting from the links, including at least several intermediate hooks that project perpendicularly from a segment of the series of intermediate links and including an end hook projecting from the first end link, said hooks containing a straight portion and a curved portion, said curved portion shaped so as to receive articles or to be hung on a projecting member, the straight portion of said end hook aligned collinearly with an axis of a nearest segment of the series of intermediate links, the apparatus being adjustable in length and shape and configurable so that it is hung by a selected hook, the remaining hooks being nonselected hooks, all nonselected hooks facing upward and allowing articles to be hung on the curved portions of said nonselected hooks when the apparatus is configured so that the end hook is the selected hook, all nonselected hooks facing upward and allowing articles to be hung on the curved portions of said nonselected hooks when the apparatus is configured so that the intermediate hook nearest the end hook is the selected hook, and all except one nonselected hook facing upward and allowing articles to be hung on the curved portions of said all except one nonselected hooks when the apparatus is configured so that the selected hook is one of two intermediate hooks other than the intermediate hook nearest the end hook.]

[4. The apparatus of claim 3, wherein the links and the hooks are made of metal.]

[5. A multipositional apparatus for hanging articles of clothing, accessories and the like, comprising:

a flexible main body comprising a series of intertwined rigid links including a first end link, a series of intermediate links and a second end link, a plurality of hooks soldered to and projecting from the links, including at least several intermediate hooks that project perpendicularly from a segment of the series of intermediate links and including an end hook projecting from the first end link, said hooks containing a straight portion and a curved portion, said curved portion shaped so as to receive articles or to be hung on a projecting member, the straight portion of said end hook aligned collinearly with an axis of a nearest segment of the series of intermediate links, the apparatus being adjustable in length and shape and configurable so that it is hung by a selected hook, the remaining hooks being nonselected hooks, all nonselected hooks facing upward and allowing articles to be hung on the curved portions of said nonselected hooks when the apparatus is configured so that the end hook is the selected hook, all nonselected hooks facing upward and allowing articles to be hung on the curved portions of said nonselected hooks when the apparatus is configured so that the intermediate hook nearest the end hook is the selected hook, and all except one nonselected hook facing upward and allowing articles to be hung on the curved portions of said all except one nonselected hooks when the apparatus is configured so that the selected hook is one of several intermediate hooks other than the intermediate hook nearest the end hook.]

[6. The apparatus of claim 5, wherein the links and the hooks are made of metal.]

*7. A method of hanging articles of clothing and/or accessories, comprising:*

*providing a multipositional apparatus, said multipositional apparatus comprising*

*a flexible main body comprising a series of intertwined rigid links including a first end link, a series of intermediate links and a second end link,*

*a plurality of hooks projecting from the links, including at least several intermediate hooks that project perpendicularly from a segment of the series of intermediate links and including an end hook projecting from the first end link,*

*said hooks containing a straight portion and a curved portion, said curved portion shaped so as to receive articles or to be hung on a projecting member,*

*the straight portion of said end hook aligned substantially collinearly with an axis of a segment of the series of intermediate links nearest said end hook,*

*the apparatus being adjustable in length and shape and configurable so that more than one hook can be selected to hang the apparatus and still allow most of a remainder of the plurality of hooks to face upward and thereby allow articles to be hung on the curved portion of said remainder of the plurality of hooks, and*

*hanging article of clothing and/or accessories on the apparatus.*

*8. The method of claim 7, wherein providing the apparatus involves providing an apparatus wherein the links and the hooks are made of metal and wherein the plurality of hooks are soldered to the links.*

* * * * *